C. B. BURROWS.
ROOT GRUBBING MACHINE.
APPLICATION FILED MAY 11, 1916.
1,226,463.
Patented May 15, 1917.
3 SHEETS—SHEET 1.
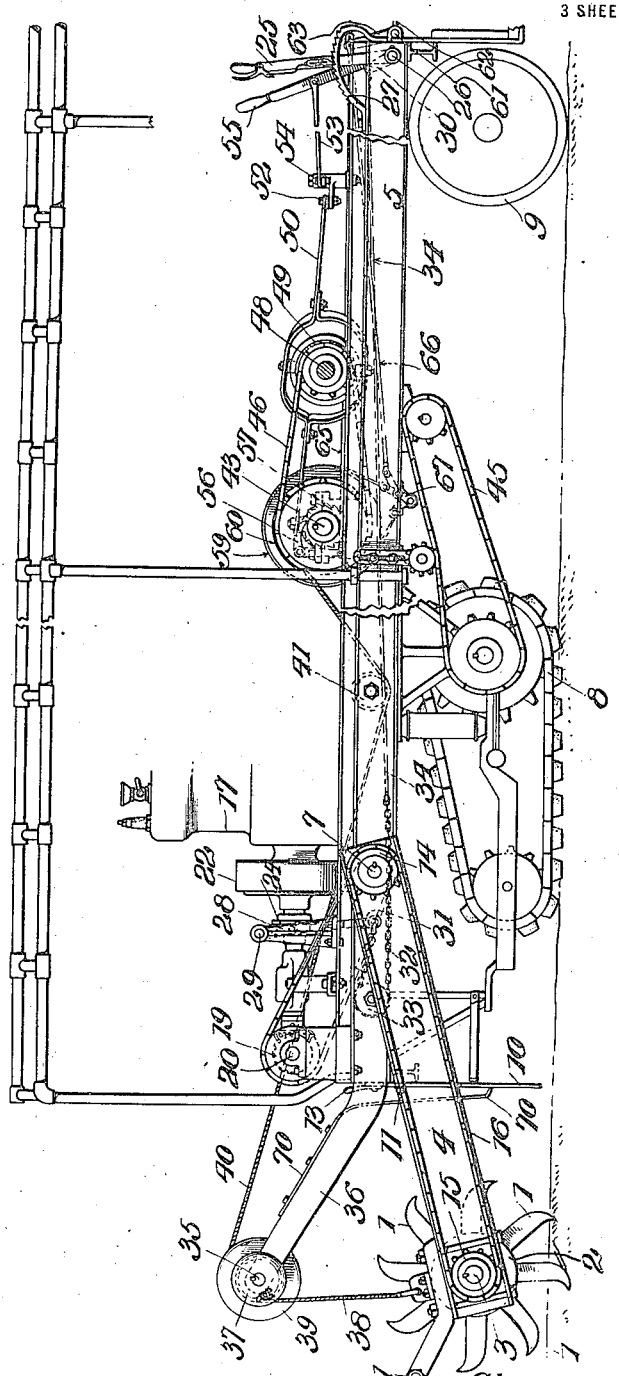
Witnesses
Inventor
Clarence B. Burrows
by James L. Norris
Attorney

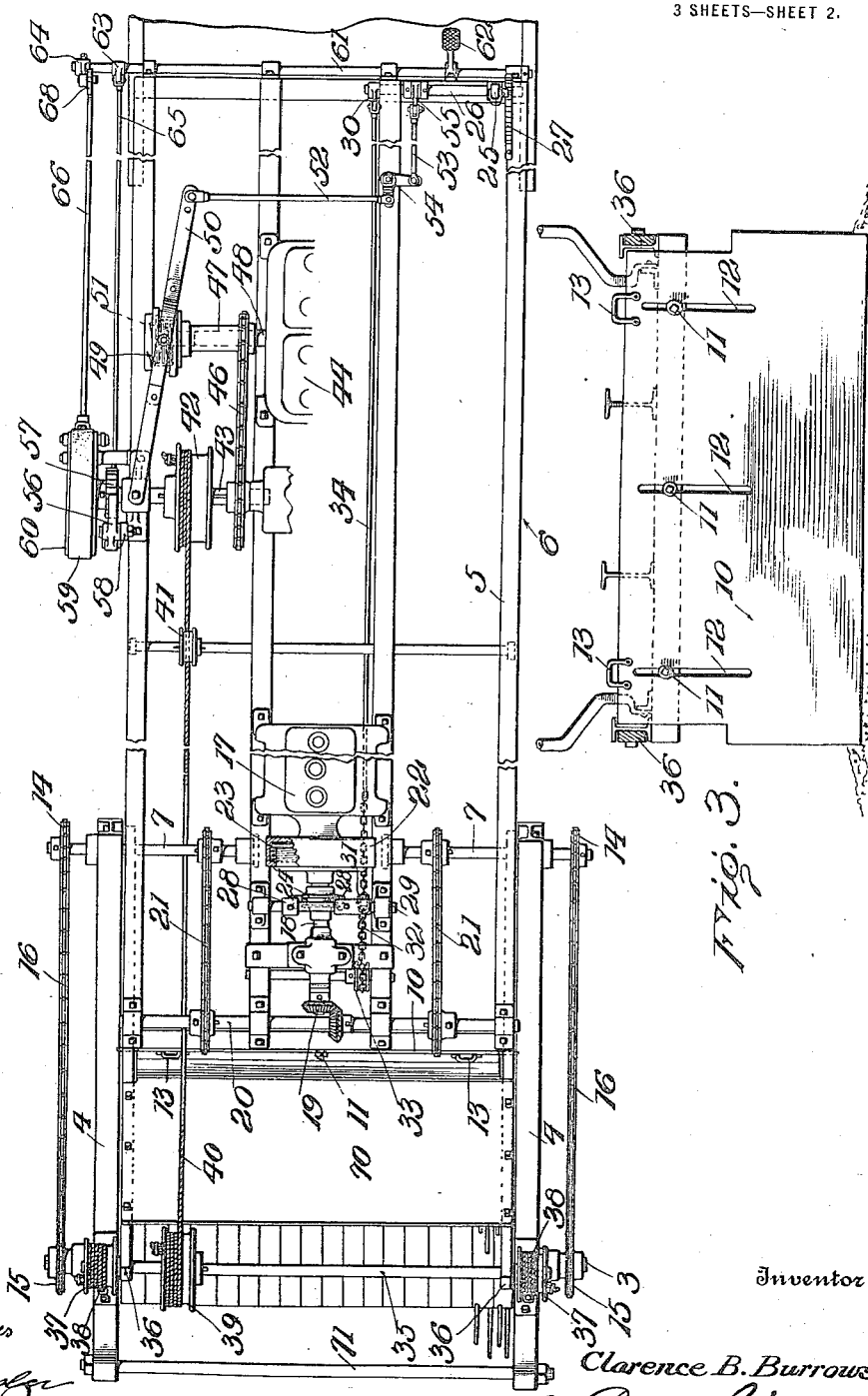

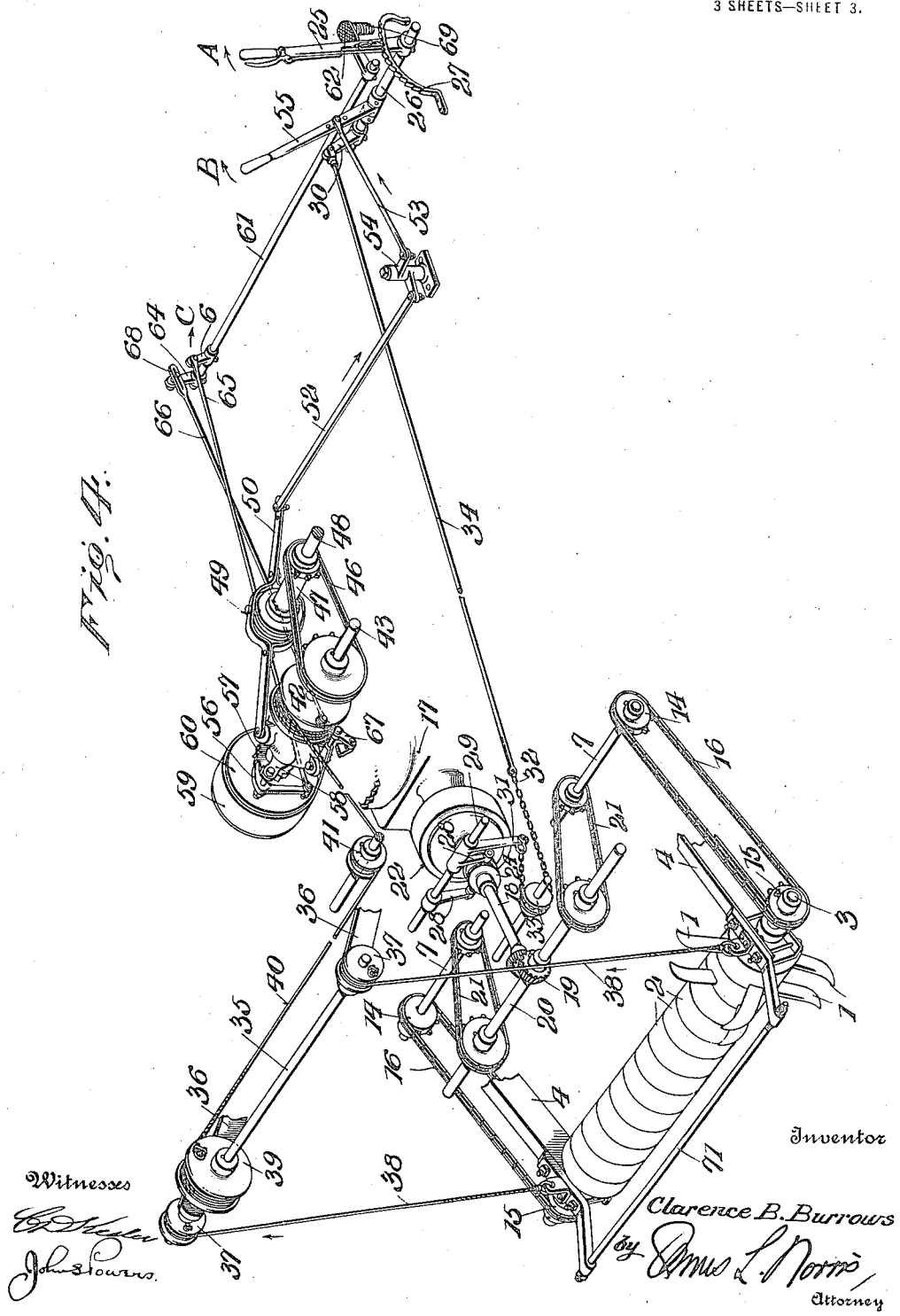

UNITED STATES PATENT OFFICE.

CLARENCE B. BURROWS, OF TAMPA, FLORIDA, ASSIGNOR, BY MESNE ASSIGNMENTS, TO FLORIDA SOIL FERTILITY COMPANY, OF TAMPA, FLORIDA, A CORPORATION OF FLORIDA.

ROOT-GRUBBING MACHINE.

1,226,463.   Specification of Letters Patent.   Patented May 15, 1917.

Application filed May 11, 1916. Serial No. 96,921.

*To all whom it may concern:*

Be it known that I, CLARENCE B. BURROWS, a citizen of the United States, residing at Tampa, in the county of Hillsborough and State of Florida, have invented new and useful Improvements in Root-Grubbing Machines, of which the following is a specification.

This invention relates to improvements in root grubbing machines.

The principal object of the present invention is to provide a root grubbing machine having a motor driven gang of knives and special features of construction and arrangement whereby the knives may be easily and quickly adjusted without interruption of their operation or interference with the operations of other parts of the machine.

The invention consists in certain novel features of structure, combination, and relation which together with the above and other objects and advantages will be apparent as the description proceeds.

An embodiment of the invention is illustrated in the accompanying drawings, wherein—

Figure 1 is a side elevation of a root grubbing machine in which the features of the invention are incorporated.

Fig. 2 is a top plan view thereof.

Fig. 3 is a detail elevation of the vertically adjustable ground smoothing and leveling plate, and Fig. 4 is a diagrammatic perspective view of the inter-related and connected operating parts.

Similar characters of reference designate corresponding parts throughout the several views.

The root grubbing knives 1 and their holders 2 are mounted on a transverse shaft 3 which has its bearings in the front ends of longitudinally disposed arms 4. The arms 4 project forwardly from the frame 5 of a tractor 6 and are pivotally mounted on transverse shafts 7 adjacent the outer sides of the side bars of said frame. The mutual spacing of the arms 4 and the length of the transverse gang of knives is greater than the width of the frame 5; and the caterpillar belts 8 by which the tractor is propelled and also the rear wheels 9 are located under the side bars of the frame 5. Hence the area or strip tilled by the knives 1 is of greater width than the transverse spacing of the belts 8 and wheels 9 and said belts and wheels accordingly operate within the tilled area or strip. These features are utilized to facilitate the movement of the tractor over the ground and to promote the uniform tillage of the strip or area within the path of the knives; for which purposes the machine includes a transverse scraping and leveling means, preferably a plate 10 arranged in the rear of the knives 1 and in front of the caterpillar belts 8. The plate 10 is set to contact with the ground and to smooth and level the strip previously harrowed by the knives. In order that the elevation of the plate 10 relative to the frame of the tractor may be adjusted as conditions may require, said plate is mounted for vertical adjustment and is preferably secured to the front bar of the frame 5 by bolts or equivalent devices 11 which pass through vertical slots 12 in said plate. The plate 10 is preferably provided with handles 13 by which it may be lifted or lowered in setting it at any desired elevation.

In adjusting the elevation of the knives 1 to regulate the depth to which said knives work in the ground the arms 4 are raised or lowered about the shafts 7 as pivotal axes; and in order that such adjustments of the arms 4 may not interfere with the operation of the knives or of other parts of the machine the shafts 7 are utilized as drive shafts for the knife carrying shaft 3, the connecting gearing preferably comprising sprockets 14 on the shafts 7, sprockets 15 on the ends of the shaft 3 and chains 16 connecting the sprockets 14 and 15 at each side of the machine.

The power for the operation of the knives is furnished by a suitable motor, preferably an internal combustion engine 17 whose shaft directly drives a longitudinal shaft 18 which forms an element of the gearing between the motor 17 and the shafts 7. The shaft 18 drives, through miter gearing 19, a transverse countershaft 20 which in turn, through sprocket gearing 21, drives the shafts 7.

The operation of the knives 1 is controlled by a clutch 22 of any suitable construction, interposed between the shaft of the engine 17 and the shaft 18, and whose elements are held in engaged relation by a spring 23. The movable element of the clutch 22 is actuated by a sleeve 24 slidably mounted on the shaft 18 and which is moved against the pressure of the spring 23 to disengage the clutch elements. The movements of the sleeve 24 are controlled by a lever 25 mounted fast on a transverse rock shaft 26 arranged near the rear end of the frame 5, said lever having a conventional locking pawl which co-acts with a rack quadrant 27. The sleeve 24 is operated by yoke arms 28 pendant from a transverse rock shaft 29. The rock shaft 26 is provided with an upright arm 30 and the rock shaft 29 is provided with a depending arm 31 which is connected to the arm 30 by a linkage including a chain 32 joined to the arm 31 and trained over an idler pulley 33 and a rod 34 extending between the chain 32 and the arm 30. By pulling the lever 25 in the direction of the arrow A in Fig. 4, i. e., rearward, the clutch 22 is operated to disconnect the shaft 18 from the shaft of the engine 17, and thereupon the rotation of the knives 1 is interrupted. Upon disengaging the pawl of the lever 25 from the rack 27 and permitting said lever to move forward the spring 23 operates the clutch 22 to connect the shaft 18 and the shaft of the engine 17, and thereupon the operation of the knives 1 is resumed.

The means for raising and lowering the knives 1 and supporting them at the desired elevation preferably includes a transverse shaft 35 which is arranged at an elevation above said knives and is journaled in forwardly and upwardly directed arms 36, constituting extensions of the side bars of the frame 5. The shaft 35 has its ends projected beyond the arms 36 and provided with winding drums 37 to which are secured cables 38 connected at their lower ends to the front ends of the arms 4.

Intermediate the arms 36 the shaft 35 is provided with a drum 39 about which is coiled a cable 40 employed to effect or permit rotation of the shaft 35 in connection with the raising or lowering of the knives. The cable 40 is trained over an idler pulley 41 and at its rear end is coiled about a windlass 42 mounted on a transverse shaft 43. The shaft 43 is operated by a motor 44 (also employed to operate the caterpillar belts 8 by gearing not shown in its entirety but which includes the sprocket chain 45 shown in Fig. 1) and is connected by sprocket gearing 46 to a shaft 47 in turn driven from the shaft 48 of the motor 44 and preferably fitted upon said motor shaft.

A friction clutch 49 of any suitable construction is employed to connect the shafts 47 and 48; and the movable element of this clutch is operated, by a yoke 50 whose front end is preferably pivoted on one of the bearings of the shaft 43 to connect the shafts 47 and 48, and, by a spring 51, to disconnect them. The yoke 50 is connected by a linkage, comprising rods 52 and 53 and a bell crank 54 to which said rods are joined to an operating lever 55 loosely mounted on the rock-shaft 26 as a pivotal axis; and by pulling the lever 55 in the direction of the arrow B in Fig. 4, i. e. rearward, the clutch 49 is operated to connect the shafts 47 and 48. When the lever 55 is released the spring 51 operates the clutch 49 to disconnect the shafts 47 and 48; the disconnected relation of these shafts being normal.

When the shafts 47 and 48 are connected by the clutch 49, the shaft 43 is driven and the windlass 42 is operated to wind thereon the cable 40 and to thereby rotate the shaft 35 and raise the arms 4 and therewith the knives. When the arms 4 have been raised to the elevation desired, the lever 55 is released and the rotation of the shaft 47 and therewith of the shaft 43 is arrested in the manner explained.

The arms 4 are held at any desired elevation by a pawl 56 which engages a ratchet wheel 57 on the shaft 43 and is pivoted on a bracket 58, preferably formed with a bearing of said shaft as shown in Fig. 4.

The rotation of the shaft 43 in either direction is kept under control by a suitable brake preferably a band brake, of usual construction whose band 59 co-acts with a drum 60 on the shaft 43.

It is preferred that the pawl 56 and the brake 59—60 should both be controlled and that their operations should be correlated by a common means. For this purpose a transverse rock shaft 61 operated by a pedal 62 is arranged in the rear of the rock shaft 26 and is provided with upright arms 63 and 64, the arm 63 being connected by a link 65 to the pawl 56 and the arm 64 being connected by a link 66 to the lever 67 which operates the brake-band 59. A lost motion connection 68 is provided between the link 66 and the arm 64 in order that the operation of the brake-band 59 may not take place until suitably after the disengagement of the pawl 56 from the ratchet wheel 57.

A light spring 69 may be arranged under the pedal 62 or otherwise to insure the normal engagement of the pawl 56 with the ratchet wheel 57.

To raise the arms 4 the lever 55 is operated as described, and simultaneously with the operation of this lever the shaft 61 is rocked in the direction of the arrow C in Fig. 4, by pressure on the pedal 62, to disengage the pawl 56 from the ratchet wheel 57 and to thereafter apply the band 59 to the drum 60. When the arms 4 have been raised to the elevation desired, the lever 55 and the pedal 62 are simultaneously released and thereupon the operation of the shaft 43 is arrested and the pawl 56 engages the ratchet wheel 57 to hold the arms 4 in the position to which they have been raised.

To lower the arms 4, the shaft 61 alone is operated, its operation in this instance being the same as that described; and the pawl 56 and brake-band 59 are thereby operated as described, the pawl being disengaged from the ratchet wheel 57 and the brake-band 59 being applied to the drum 60. Since the elements of the clutch 49 are normally disengaged, the shaft 43 will rotate in connection with the gravitating descent of the arms 4 and the gang of knives 1 supported thereby, and the cable 40 will pay out from the windlass 42 and will be rewound on the drum 39. When the arms 4 have been lowered as far as desired the pedal 62 is released to effect the engagement of the pawl 56 with the ratchet wheel 57 and the disengagement of the brake-band 59 from the drum 60.

The depth to which the knives 1 should penetrate the ground will depend on a number of conditions such, for example, as the character of the work in hand, the character of the soil, or the degree of aeration required, but in any event an easy and accurate adjustment of the elevation of said knives may be made by means of the devices previously described.

The arms 36 preferably carry a dust-guard or apron 70 located in front of the scraper-plate 10; and the arms 4 preferably carry a guard-bar 71 located in front of the knives 1.

It is not deemed necessary to show or describe the knives 1 in detail, since the construction and arrangement of these knives forms no part of the invention to which this application is directed and since these knives are preferably constructed, arranged and operated as shown and described in my Letters Patent No. 1,186,375.

While I have shown and described a single embodiment of the invention, it will be understood that this specific disclosure and description is not intended to impose any limitation upon the scope of the appended claims not inherent in the language thereof or to be taken otherwise in connection therewith except for the purpose of exposition, where necessary.

I claim:—

1. In a root grubbing machine, in combination, a transverse series of knives, a tractor, a pair of arms carrying the knives and movably connected to the tractor, a transverse shaft arranged above said knives, a pair of drums on said shaft, cables extending between said drums and said arms, a third drum on said shaft, a second transverse shaft, a windlass on said second shaft, a ratchet wheel on said second shaft, a cable extending between said third drum and said windlass, a pawl co-acting with said ratchet wheel, a motor, gearing between said motor and said second shaft including a clutch, means for operating said clutch including a lever and an actuating element for said pawl arranged in proximity to said lever.

2. In a root grubbing machine, in combination, a transverse series of knives, a tractor, a pair of arms carrying the knives and movably connected to the tractor, means for raising said knives or permitting their gravitating descent, a motor for operating said means, a clutch for controlling the operation of said means from said motor, a pawl co-acting with said means for holding said knives at any desired elevation, a brake co-acting with said means for controlling the operation thereof, means including a lever for operating said clutch and an operating element common to said pawl and brake arranged in proximity to said lever.

3. In a root grubbing machine, in combination, a transverse series of knives, a tractor, a pair of arms carrying the knives and movably connected to the tractor, a transverse shaft arranged above said knives, a pair of drums on said shaft, cables extending between said drums and said arms, a third drum on said shaft, a second transverse shaft, a windlass on said second shaft, a ratchet wheel on said second shaft, a cable extending between said third drum and said windlass, a pawl co-acting with said ratchet wheel, a brake-drum on said second shaft, a brake-band co-acting with said drum, a motor, gearing between said motor and said second shaft including a clutch, means for operating said clutch including a lever and an actuating element common to said pawl and brake-band arranged in proximity to said lever.

4. In a root grubbing machine, in combination, a transverse series of knives, a tractor, a pair of arms carrying the knives and pivoted to the tractor, said arms projecting forwardly from the tractor, a second pair of fixed arms projecting forwardly from the tractor, a transverse shaft journaled in said fixed arms, drums on said shaft, cables extending between said drums and said knife-carrying arms, a second motor driven transverse shaft located in the rear of said first shaft and operatively connected thereto to rotate the first shaft and effect raising of the knives or permit rotation of the first shaft and lowering of the knives, a ratchet wheel on the second shaft, a pawl co-acting with the ratchet wheel, a clutch controlling the operation of the second shaft, and juxtaposed devices for controlling said pawl and said clutch.

In testimony whereof I have hereunto set my hand in presence of two subscribing witnesses.

CLARENCE B. BURROWS.

Witnesses:
C. J. MORROW,
PASCO ALTMAN.